United States Patent
Hirt et al.

(10) Patent No.: US 12,024,024 B2
(45) Date of Patent: Jul. 2, 2024

(54) WHEEL DRIVE MODULE OF MODULAR CONSTRUCTION

(71) Applicant: ebm-papst St. Georgen GmbH & Co. KG, St. Georgen (DE)

(72) Inventors: Markus Hirt, Villingen-Schwenningen (DE); Frank Jeske, St. Georgen (DE); Joerg Hornberger, Dornstetten-Aach (DE); Manfred Bitzer, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 568 days.

(21) Appl. No.: 17/268,355

(22) PCT Filed: Jun. 14, 2019

(86) PCT No.: PCT/EP2019/065731
§ 371 (c)(1),
(2) Date: Feb. 12, 2021

(87) PCT Pub. No.: WO2020/083538
PCT Pub. Date: Apr. 30, 2020

(65) Prior Publication Data
US 2021/0316606 A1 Oct. 14, 2021

(30) Foreign Application Priority Data
Oct. 25, 2018 (DE) ............ 10 2018 126 700.2

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/043* (2013.01); *B60K 17/30* (2013.01);
(Continued)

(58) Field of Classification Search
CPC ............ B60K 7/0007; B60K 2007/003; B60K 2007/0038; B60K 2007/0069;
(Continued)

(56) References Cited

U.S. PATENT DOCUMENTS 6,491,127 B1 * 12/2002 Holmberg .............. B62D 7/026
301/6.5
2003/0127260 A1 * 7/2003 Angeles .............. B60L 15/2054
180/24.07
(Continued)

FOREIGN PATENT DOCUMENTS

DE 601 03 191 T2 1/2005
DE 10 2005 058 400 A1 5/2007
(Continued)

OTHER PUBLICATIONS

International Search Report and Eng. translation dated Sep. 6, 2019, issued in the corresponding PCT Patent Application No. PCT/EP2019/065731.
(Continued)

*Primary Examiner* — Jeffrey J Restifo
(74) *Attorney, Agent, or Firm* — Dickinson Wright PLLC

(57) ABSTRACT

A wheel drive module comprises wheel (R), speed modulation gearbox (G), first electric motor (M1), and second electric motor (M2). First and second electric motors (M1, M2) jointly drive wheel (R) about wheel axis (A) by the speed modulation gearbox (G) and steer said wheel about steering axis (L). Wheel drive module comprises first motor electronics (10) for controlling first electric motor (M1) and second motor electronics (20) for controlling second electric motor (M2) and central electronics (30) connected to first and second motor electronics (10, 20), allowing a signal transfer. Wheel drive module comprises control logic for controlling first and second electric motors (M1, M2), which logic is provided by first and second motor electronics (10,
(Continued)

20), central electronics (30), application electronics (40) connected to the central electronics (30), allowing a signal transfer, or jointly by the central electronics (30) and the first and second motor electronics (10, 20).

14 Claims, 1 Drawing Sheet

(51) Int. Cl.
  B60K 17/30 (2006.01)
  B62D 5/04 (2006.01)
  B60L 15/20 (2006.01)
(52) U.S. Cl.
  CPC ...... B62D 5/0418 (2013.01); *B60K 2007/003* (2013.01); *B60K 2007/0084* (2013.01); *B60L 15/2009* (2013.01); *B60L 2220/42* (2013.01)
(58) Field of Classification Search
  CPC ... B60K 27/043; B60K 27/30; B60L 15/2009; B60L 2220/42; B60L 2220/44
  See application file for complete search history.

(56) References Cited

U.S. PATENT DOCUMENTS

| | | | |
|---|---|---|---|
| 2010/0206647 A1 | 8/2010 | Ishii et al. | |
| 2013/0333966 A1* | 12/2013 | Bryant | B60K 17/30 180/65.51 |
| 2014/0058600 A1* | 2/2014 | Hoffmann | B60L 58/18 180/21 |
| 2014/0145495 A1* | 5/2014 | Shin | B60K 7/0007 301/6.5 |
| 2014/0297076 A1* | 10/2014 | Hasegawa | B62K 11/007 701/22 |
| 2014/0297125 A1* | 10/2014 | Araki | G05D 1/0268 701/41 |
| 2014/0371975 A1* | 12/2014 | Biber | B60L 50/52 701/23 |
| 2015/0251715 A1* | 9/2015 | Hutson | B60K 1/02 180/21 |
| 2019/0144036 A1* | 5/2019 | Geiger | B62D 15/00 180/6.5 |
| 2019/0145471 A1* | 5/2019 | Carbone | F16D 49/10 180/210 |
| 2019/0248177 A1* | 8/2019 | Almutairi | B60L 7/26 |
| 2020/0216128 A1* | 7/2020 | Doerksen | B62D 37/04 |
| 2020/0276877 A1* | 9/2020 | Gao | B62D 7/1581 |
| 2021/0050805 A1* | 2/2021 | Hirt | B60W 10/08 |
| 2021/0086612 A1* | 3/2021 | Imamura | B60K 17/346 |
| 2021/0316606 A1* | 10/2021 | Hirt | B60K 7/0007 |
| 2022/0065623 A1* | 3/2022 | Hirt | B60K 17/30 |
| 2022/0169113 A1* | 6/2022 | Sato | B60K 7/0007 |
| 2022/0227168 A1* | 7/2022 | Schwaiger | B60K 7/0007 |
| 2023/0146720 A1* | 5/2023 | Kautzmann | B62D 11/04 301/65 |

FOREIGN PATENT DOCUMENTS

| | | |
|---|---|---|
| DE | 202008004190 U1 | 6/2008 |
| DE | 102016007445 A1 | 12/2017 |
| JP | 3407430 B2 | 5/2003 |
| WO | 2017/ 214 686 A1 | 12/2017 |

OTHER PUBLICATIONS

German Search Report dated Mar. 8, 2019, which issued in the corresponding German Patent Application No. 10 2018 126 700.2.

* cited by examiner

WHEEL DRIVE MODULE OF MODULAR CONSTRUCTION

BACKGROUND

Field

The invention relates to a wheel drive module which is formed by multiple assemblies which can be replaced as modules, and which control logic can be implemented in a modular manner on multiple assemblies of the wheel drive module.

Description of Related Art

A multitude of wheel drive modules and wheel drive concepts for the most varied fields of application is known from prior art. In most cases, multiple wheel drive modules are used for an application. For example, four wheel drive modules can be used for driving a transport carriage and particularly for driving a driverless transport vehicle as part of a driverless transport system in the field of logistics. Alternatively, more or less wheel drive modules may be used, which may be combined with support rollers. For example, transport vehicles may comprise two wheel drive modules and one or two support rollers, or may alternatively comprise eight wheel drive modules to achieve a drive power and load capacity adapted to the respective use.

SUMMARY

If wheel drive concepts are intended to be combined in a single module, it is advantageous that this module is compact in structure and consequently needs a small installation space only. But in the known wheel drive concepts, this in most cases means that, while the wheel drive concept is combined in one module, the individual components of the resulting wheel drive module cannot be replaced. Particularly in logistics applications which require a high load capacity and at the same time a long service life of the wheel drive modules, it is necessary to replace individual components fast and easily, for example in the event of occurring wear. In addition to repair and maintenance, the prior art wheel drive modules cannot be adjusted to specific customer wishes for a respective application, or at least such adjustment is not cost-efficient, since individual components of the wheel drive modules cannot be replaced.

In addition, control of the motors of the wheel drive module is in most known wheel drive modules a centralized solution for multiple wheel drive modules, such that the central controller must receive all information, such as sensor data, from all wheel drive modules, calculate all control signals for all motors of all wheel drive modules, and send these signals to all wheel drive modules. This results in high data rates of information to be transmitted and a high computer load for calculating the control signals in the central controller. If an individual wheel drive module is replaced or if individual components of a wheel drive module change, the entire central controller must be adjusted.

Furthermore, reliable or secure sources of information are needed for calculating the control signals for the motors and monitoring the wheel drive modules. In the prior art, this is achieved in that all sources of information or sensors are configured to verify a correct value or an error message and to certify all components according to the respective relevant safety standard. This however makes the wheel drive modules or individual components thereof very expensive.

Therefore, the underlying problem of the invention is to overcome the disadvantages mentioned above and to provide a wheel drive module which is compact in structure and only needs little installation space.

This problem is solved by the combination of features according to the claims.

According to the invention, a wheel drive module is proposed comprising a wheel, a speed modulation gearbox, as well as a first electric motor and a second electric motor. The first and second electric motors are designed to jointly drive the wheel by means of the speed modulation gearbox about a wheel axis and about a steering axis orthogonal to the wheel axis. The wheel drive module further comprises first motor electronics for controlling the first electric motor and second motor electronics for controlling the second electric motor, and central electronics connected electrically or in terms of control to the first and second motor electronics, thus allowing a signal transfer between the first and second electric motors and the central electronics. For controlling the first and second electric motors, the wheel drive module comprises a control logic to drive the wheel about the wheel axis and to steer it about the steering axis. The control logic is provided by the first and second motor electronics, the central electronics, application electronics connected to the central electronics, thus allowing a signal transfer, or jointly by the central electronics and the first and second motor electronics.

If a transport vehicle uses multiple wheel drive modules, for example, it can have a controller of its own which sends drive commands to the control logic of the wheel drive module and is itself provided on the application electronics. The wheel drive modules correspond to a driving-steering system which at the same time provides propulsion or driving functionality and a steering functionality by means of the two electric motors used, which jointly both drive and steer a wheel. The application electronics can in this case be positioned outside the actual wheel drive module or outside the driving-steering system, respectively.

If the wheel drive concepts are bundled as proposed in a single assembly or wheel drive module, it is advantageous that this can be given a compact design and therefore only needs little space, for example to allow the drive and steering system for a driverless transport vehicle to be bundled and housed in the module. In addition, bundling the driving and steering functionalities (drive and steering) in one wheel drive module makes it possible to accommodate other components, such as mechanical struts or cable harnesses between the wheel drive modules of a vehicle. The structure of the wheel drive module also results in a flat design of the individual wheel drive modules and a flat design of the entire vehicle, such that safety-relevant components, for example laser scanners for scanning the surroundings, can be arranged above the individual wheel drive modules, allowing a protective field to be built which envelopes the driverless transport vehicle in which the vehicle can react to objects detected by the laser scanner(s).

In an advantageous embodiment, the first electric motor together with the first motor electronics forms a first motor assembly which can be replaced as a module and the second electric motor together with the second motor electronics forms a second motor assembly which can be replaced as a module. The motor assemblies preferably each have a communication interface through which all components of the respective motor assembly can be connected to the central electronics or to the respective other motor assembly, allowing information exchange.

Bundling the respective electric motor and the motor electronics which is directly needed for controlling the electric motor into one assembly results in a low space requirement of the entire wheel drive module. Bundling the individual functionally associated components, such as the first electric motor with the first motor electronics, and the second electric motor with the second motor electronics into a motor assembly which can be replaced as a module, the motor assemblies or modules can be selected and installed depending on the respective intended use when configuring a wheel drive module. For example, the various selectable motor assemblies can include different power ratings, functions, steering functionalities, dimensions, and the like.

In an advantageous further development of the wheel drive module, the wheel forms an assembly with the speed modulation gearbox.

When designing or configuring the wheel drive module, the wheel assembly can be selected such that specific requirements are met depending on the intended use. For example, the various selectable wheel assemblies may comprise or allow different wheel diameters of the wheel, immersion depths of the wheel into the speed modulation gearbox, or ground clearances of the wheel.

By means of the assemblies which can be replaced as modules, a wheel drive module having a modular construction can be provided which is based on two electric motors which drive the wheel of the wheel drive module via a speed modulation gearbox and rotate it about the steering axis of the wheel. This makes it possible to provide a driving function, a braking function, stopping function, and steering function with the two electric motors, wherein the two motors jointly provide an optimum torque for driving and steering the wheel. The electric motors which jointly drive the wheel can fulfill maximum operating point requirements. For example, the two electric motors allow fast driving forward, accelerating, and braking under a high load as well as a high steering torque at standstill.

Modularization or the use of prefabricated assemblies particularly allows customization or customizability adjusted to the respective intended use and the requirements, particularly when configuring a wheel drive module, while at the same time the use of identical parts and standard components can help to save costs.

Both motors always contribute to driving and steering, depending on the situation. The torques of the motors are assigned to the respective tasks depending on the situation whether the motors are performing a driving and steering motion or a mere driving motion. There is no steering motion during a mere driving motion, regardless whether forward or reverse. This means that the torques of both motors are added. The motors provide the wheel via the speed modulation gearbox with an identical rotational speed, such that there is no speed difference at the steering axis during the mere driving motion and no rotation of the wheel about the steering axis is caused. The motors thus hold the wheel indirectly during a mere driving motion.

In addition, high overall torques can be achieved requiring little installation space when using motors with a high power density and high short-time overload capacity, since the individual torques add up to an overall torque during a mere driving motion. In the overload range, the two motors of a wheel drive module or driving-steering system yield a six to eight-fold overall overload capacity by adding the three to four-fold individual overload capacities of each motor.

Advantageously, two identical electric motors are used in an embodiment for a wheel drive module, wherein the electric motors are selected depending on the intended use and a load capacity in the designing or configuring phase of the wheel drive module. This also allows the use of larger volumes of a single type of electric motor, which has a favorable influence on procurement, maintenance, and stockholding.

In another advantageous embodiment, the first motor assembly comprises at least one first sensor for detecting motor characteristics of the first electric motor, particularly for detecting a rotor position of a rotor of the first electric motor and/or for detecting a rotational speed of the first electric motor for controlling the motor. The first sensor for detecting the rotor position can particularly be a Hall sensor with which the position or orientation of the rotating magnetic field at the rotor can be detected and the associated electric motor can be controlled based on the rotor position. The first sensor can to this end either be directly integrated into the first electric motor of aligned along the first electric motor and assigned by the assembly.

Analogously, in another advantageous embodiment, the second motor assembly comprises at least one second sensor for detecting motor characteristics of the second electric motor, particularly for detecting a rotor position of a rotor of the second electric motor and/or for detecting a rotational speed of the second electric motor for controlling the motor. The second sensor may as well be a Hall sensor with which the position or orientation of the rotating magnetic field at the rotor of the associated electric motor can be detected and the electric motor can be controlled based on the rotor position. Likewise, the second sensor can to this end either be directly integrated into the second electric motor of aligned along the second electric motor and assigned by the assembly.

Alternatively, the first and/or second sensor may also be configured as a multi-turn sensor for redundant rotational speed detection or a single-turn sensor for absolute value detection of the rotor position. The first and second motor assemblies can to this end also comprise multiple first and second sensors.

In an additional, advantageous embodiment of the invention, the central electronics forms a central assembly which can be replaced as a module. The central electronics can, depending on the assembly/assemblies in which the control logic is implemented, also just establish a connection between other assemblies and the controller of the application, such as the controller of a transport carriage, and not have intelligence of its own. This is the case, for example, if the control logic is distributed over the first and second motor electronics and the central electronics is only used for exchange of information between the first and second motor electronics or the first or second motor electronics and the application electronics. Particularly if the control logic is provided by the central electronics, it can be exchanged fast and efficiently for another control logic. For example, the control logic can be adjusted regardless of the wheel drive module and then switched, which will shorten potential downtime of an application using the wheel drive module. In addition, the central electronics of central assembly can be selected from multiple available prefabricated central assemblies and with different central electronics depending on the electric motors used and/or a predetermined intended use.

In another embodiment, the wheel drive module further has a third sensor for detecting wheel characteristics of the wheel, particularly for detecting a wheel speed of the wheel about the wheel axis and/or a steering angle of the wheel about the steering axis. The third sensor is connected to the central electronics, allowing signal transfer.

In an advantageous embodiment, particularly if the wheel speed and the steering angle are to be detected, the third sensor is in addition used for the wheel speed and another sensor, for example a sixth sensor, is used for the steering angle. The steering angle and the wheel speed can alternatively be determined by means of the rotational speeds of the electric motors together with the transmission ratio of the speed modulation gearbox or the transmission ratios of the electric motors to the wheel.

Furthermore, in another advantageous embodiment, the wheel drive module comprises a safety brake for braking a rotation of the wheel about the wheel axis or about the steering axis. The wheel drive module or the safety brake preferably comprises a brake electronics associated with the safety brake and controlling the same. The safety brake or brake electronics is connected to the central electronics, allowing signal transfer.

The wheel drive module can comprise two safety brakes, which are functionally separated but may be housed in a joint assembly, to be able to brake the rotation of the wheel about the steering axis as well as the rotation of the wheel about the wheel axis.

Preferably, the third sensor and the safety brake form a brake assembly which can be replaced as a module.

The control logic is furthermore configured to control the electric motor using various control methods, depending on the type of electric motor used or depending on a control command by the higher-order application. For example, a respective electric motor can be controlled depending on its type by the control logic by means of a field-oriented control method or another control method suitable for the respective type.

In an advantageous embodiment, the wheel drive module comprises a fourth sensor for detecting motor characteristics of the first electric motor for redundant detection of measured or sensor values. The fourth sensor is provided for detecting a rotational speed of the first electric motor. Furthermore, the fourth sensor can be configured as a sensor assembly which can be replaced as a module.

Analogously, in a likewise advantageous embodiment, the wheel drive module comprises a fifth sensor for detecting motor characteristics of the second electric motor, particularly for detecting a rotational speed of the second electric motor. The fifth sensor is preferably likewise configured as a second sensor assembly which can be replaced as a module, wherein the fourth and fifth sensors may also be housed in a joint sensor assembly.

To allow signal transfer, the individual assemblies can be in contact with each other via a simple connection or, alternatively, be connected by means of a bus system. Preferably, at least the first and second motor assemblies are connected to the central assembly by means of a bus system, such that the bus system allows the signal transfer.

Furthermore, a method can be implemented by the control logic for controlling electric motors, whereby, for example, only the target speed or target rotational speed of the wheel about the wheel axis and a target angle of the wheel about the steering axis or other status values are received from the control logic of the higher-order application only receives the target speed or target rotational speed of the wheel about the wheel axis as well as a target steering angle of the wheel about the steering axis or other status values relating to the wheel are received from the control logic from the higher-order application, and the method determines respective motor characteristics for controlling the two electric motors.

The wheel drive module also preferably forwards status information of the wheel and/or the electric motors to the higher-order application. Redundant information sources such as sensors can be present to verify if the forwarded status information indeed is correct status information and not incorrect status information, for example due to a sensor defect. The available status information from the sensors and actuators can be converted and compared by a safety logic for checking the plausibility and verifying it and for forwarding the plausibility-checked or actual status information to the higher-order application or to the control logic for controlling the electric motors.

BRIEF DESCRIPTION OF THE DRAWINGS

Other advantageous further developments of the invention are characterized in the dependent claims or are explained in more detail below with reference to the figures and together with a preferred embodiment of the invention. Wherein:

The figures are exemplary and schematic. Like reference numerals in the figures indicate like functional and/or structural features.

DETAILED DESCRIPTION OF THE ILLUSTRATIVE EMBODIMENTS

Figure 1:
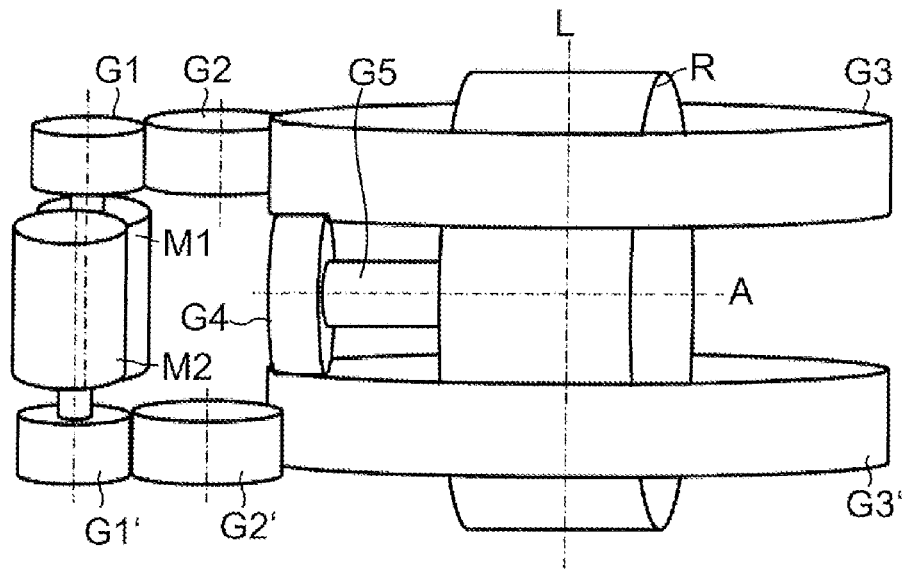
FIG. 1 shows a wheel driven by a first and second electric motors via a speed modulation gearbox.

FIG. 1 illustrates the wheel R, the first and second electric motors M1, M2, and the speed modulation gearbox G for driving and steering the wheel R by means of the two electric motors M1, M2. FIG. 1 only shows one possible embodiment option of the drive of the wheel R about the wheel axis A and the steering axis L by means of the first and second electric motors M1, M2. For example, the wheel R can be arranged below the drive gear rims G3, G3', or the electric motors M1, M2 can have another transmission ratio to the drive gear rims G3, G3' and another orientation. In the example shown, the speed modulation gearbox G comprises the pinions G1, G1', the intermediate wheels G2, G2', the drive gear rims G3, G3', and the drive gearwheel G4 and output shaft G5. Furthermore, the speed modulation gearbox G can comprise other components in other embodiments.

The first and the second electric motors M1, M2 drive the first and second drive gear rims G3, G3'. The first electric motor M1 is arranged opposite the electric motor M2 in the embodiment shown, wherein the electric motors M1, M2 may each comprise a motor gear assembly of their own. The electric motors M1, M2 are each connected to a pinion G1, G1' via a respective motor shaft.

The gearing of the first pinion G1 engages in a gearing of a first intermediate wheel G2, the gearing of which engages in a drive gearing of the first drive gear rim G3, such that the first drive gear rim G3 can be rotated about the axis of rotation or steering axis L by a rotation of the first pinion G1 driven by the first electric motor M1.

This applies analogously to the second drive gear rim G3'. The gearing of the second pinion G1' engages in a gearing of a second intermediate wheel G2', the gearing of which engages in a drive gearing of the second drive gear rim G3', such that the second drive gear rim G3' can be rotated about the axis of rotation or steering axis L by a rotation of the second pinion G1' driven by the second electric motor M2.

An output gearwheel G4 is arranged between the first and second drive gear rims G3, G3', the gearing of which output gearwheel G4 engages both in a gearing of the first drive gear rim G3 facing the output gearwheel G4 and in a gearing of the second drive gear rim G3' facing the output gearwheel G4. The rotation of the output gearwheel G4 (third rotation) is therefore determined by both the rotation of the first drive gear rim G3 (first rotation) and by the rotation of the second drive gear rim G3' (second rotation).

A drive shaft G5 which is connected to the output gearwheel G4 in a rotationally fixed manner extends from the output gearwheel G4 along a wheel axis A towards the axis of rotation or steering axis L of the drive gear rims G3, G3'. The wheel R is connected in a rotationally fixed manner to the output shaft G5 on a side spaced apart from the output gearwheel G4 along the wheel axis A, whereby a rotation (third rotation) of the output gearwheel G4 is transmitted to the wheel R via the output shaft G5. As shown, sections of the wheel R are received between the first drive gear rim G3 and the second drive gear rim G3', which are spaced apart along their axis of rotation L and span a wheel receiving space between each other. Both drive gear rims G3, G3' have a rim opening extending along the axis of rotation L of the respective drive gear rim G3, G3'. The wheel R extends on at least its side facing the ground through the respective rim opening, such that the wheel R has substantially five sections. A first section, in which the wheel R is arranged between the drive gear rims, two second sections, in which the wheel R is arranged in the rim openings of the drive gear rims G3, G3', and two third sections, in which the wheel R is located outside the gear drive rims G3, G3' along the axis of rotation L.

Arrangement of the wheel R in the wheel receiving space has three advantageous effects. The installation space of the wheel drive module is considerably reduced, since the wheel R does not have to move around the drive gear rims G3, G3' during a steering motion, and the potential steering angle is widened, since the wheel R can be rotated 360° in the drive gear rims G3, G3', such that the steering motion or rotation about the axis of rotation L is limited by the intermediate wheels G2, G2'.

In addition, the wheel R is protected by the wheel drive module 1 or by the first and second drive gear rims G3, G3', since these form a cage around the wheel R.

Figure 2:
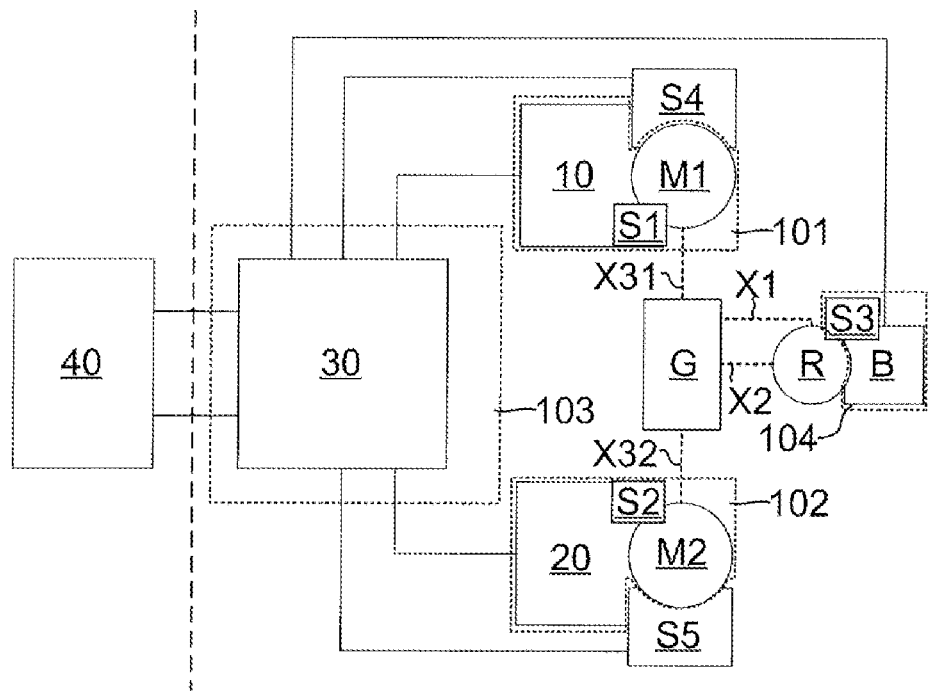
FIG. 2 shows a schematic view of a wheel drive module.

FIG. 2 shows a schematic view of the wheel drive module. A driving function X2 and a steering function X1 are provided at or by the wheel R by means of driving the wheel R about the steering axis L and the wheel axis A. For providing the steering and driving functions X1, X2 by means of the speed modulation gearbox G, the speed modulation gearbox is driven by the first and second electric motors M1, M2 using the first and second operative connections X31, X32.

To allow fast replacement of the electric motors M1, M2, the motors and their associated components are bundled in a respective motor assembly 101, 102. The first motor assembly 101 or the second motor assembly 102 can each be replaced fast and easily as a module. For example, one of the motor assemblies 101, 102 or both motor assemblies 101, 102 can be replaced for an alternative motor assembly which comprises an electric motor having a higher power rating as well as components adjusted to controlling the electric motor.

The first or second motor assembly 101, 102 in the embodiment shown includes a first or second motor electronics 10, 20 for directly controlling the respective electric motor M1, M2 as well as a first or second sensor S1, S2 by which motor values such as the rotor position of the respective electric motor M1, M2 are determined. In the embodiment shown, the first or second sensor S1, S2 is directly coupled to the respective motor electronics 10, 20, wherein the motor values determined by the sensors S1, S2 can be used for controlling the respective electric motor M1, M2 and the motor values can be passed on to other components as needed.

The first and second motor assemblies 101, 102 are connected to the central assembly 103, which comprises central electronics 30, by bus lines shown as solid lines. Depending on whether a control logic for controlling the electric motors M1, M2 by the first and second motor electronics 10, 20, the central logic 30, or a higher-order application electronics 40 is implemented, the central electronics can just establish a connection for the various data and bus lines and thus merely be used as an information interface, or it can have its own control logic implemented by the central electronics.

For controlling the electric motors M1, M2, another sensor S4, S5 is provided in the embodiment shown in FIG. 2 at the electric motors M1, M2 to detect the rotational speed of the electric motors. The fourth sensor S4 is assigned to the first electric motor M1 but is not a part of the motor assembly 101, and the fifth sensor S5 is assigned to the second electric motor M2 but is not a part of the second motor assembly 102. The fourth and fifth sensors S4, S5 are each connected to the central electronics 30 in the embodiment shown, wherein the sensor information or the values detected by the fourth and fifth sensors S4, S5 can be provided via the central electronics 30 to the application electronics 40 or the first or second motor electronics 10, 20.

An additional safety brake B which is combined with a third sensor S3 into a brake assembly 104 is provided to achieve a safe state in the event of a defect of the first or second electric motor M1, M2. The safety brake B can at least be used to block the driving function X2 or the rotation of the wheel R about the wheel axis A, such that wheel drive module or the wheel R can be brought to a standstill and a safe state can be achieved. The third sensor S3 directly detects status values of the wheel R, such as the rotational speed of the wheel R about the wheel axis A, wherein the detected values are available to the central electronics or the other assemblies via the connection of the brake assembly 104 to the central electronics 30.

The control logic for controlling the first and second electric motors M1, M2 can be distributed over the first and second motor electronics 10, 20, such that only a portion of the computing load must be handled by each of them. Alternatively, the control logic can also be provided by the central electronics 30, which for example provides a target motor speed to the first and second motor electronics 10, 20. Alternatively, the control logic can also be provided by the application electronics 40.

Thus an implemented control logic can be replaced fast by a deviating control logic by replacing the respective assembly. In addition, the information to be transmitted to and from the control logic and the computing load to be handled by the control logic can be reduced, since a separate control logic is provided for each wheel drive module of an application, not a central control logic for all wheel drive modules.

The invention claimed is:

1. A wheel drive module comprising a wheel (R), a speed modulation gearbox (G), as well as a first electric motor (M1) and a second electric motor (M2), wherein
the first and second electric motors (M1, M2) are designed to jointly drive the wheel (R) by means of the speed modulation gearbox (G) about a wheel axis (A) and about a steering axis (L) orthogonal to the wheel axis (A),
the wheel drive module further comprises a first motor electronics (10) for controlling the first electric motor (M1) and a second motor electronics (20) for controlling the second electric motor (M2) as well as a central electronics (30) which is connected to the first and second motor electronics (10, 20), allowing signal transfer, and wherein
the wheel drive module comprises a control logic for controlling the first and second electric motors (M1, M2) for driving the wheel (R) about a wheel axis (A) and steering the wheel about the steering axis (L), which logic is provided by the first and second motor electronics (10, 20), the central electronics (30), application electronics (40) connected to the central electronics (30), thus allowing a signal transfer, or jointly by the central electronics (30) and the first and second motor electronics (10, 20).

2. The wheel drive module according to claim 1, wherein
the first electric motor (M1) together with the first motor electronics (10) forms a first motor assembly (101) which can be replaced as a module, and
the second electric motor (M2) together with the second motor electronics (20) forms a second motor assembly (102) which can be replaced as a module.

3. The wheel drive module according to claim 2, wherein the first motor assembly (101) comprises at least one first sensor for detecting motor characteristics of the first electric motor (M1), for detecting a rotor position of a rotor of the first electric motor (M1) and/or for detecting a rotational speed of the first electric motor (M1).

4. The wheel drive module according to claim 3, wherein
the second motor assembly (102) comprises at least one second sensor for detecting motor characteristics of the second electric motor (M2), for detecting a rotor position of a rotor of the second electric motor (M2) and/or for detecting a rotational speed of the second electric motor (M2).

5. The wheel drive module according to claim 4, further comprising a third sensor (S4) for detecting motor characteristics of the first electric motor (M1), for detecting a rotational speed of the first electric motor (M1).

6. The wheel drive module according to claim 5, further comprising a fourth sensor (S5) for detecting motor characteristics of the second electric motor (M2), for detecting a rotational speed of the second electric motor (M2).

7. The wheel drive module according to claim 3, wherein the central electronics (30) forms a central assembly (103) and at least the first and second motor assemblies (101, 102) are connected to the central assembly (103) by a bus system and the bus system allows signal transfer.

8. The wheel drive module according to claim 2, wherein
the second motor assembly (102) comprises at least one sensor for detecting motor characteristics of the second electric motor (M2), for detecting a rotor position of a rotor of the second electric motor (M2) and/or for detecting a rotational speed of the second electric motor (M2).

9. The wheel drive module according to claim 1, wherein the central electronics (30) forms a central assembly (103) which can be replaced as a module.

10. The wheel drive module according to claim 1, further comprising
a sensor for detecting wheel characteristics of the wheel (R), for detecting a wheel speed of the wheel (R) about the wheel axis (A) and/or a steering angle of the wheel (R) about the steering axis (L), which sensor is connected to the central electronics (30), allowing signal transfer.

11. The wheel drive module according to claim 1, further comprising a safety brake (B) for braking a rotation of the wheel (R) about the wheel axis (A) or about the steering axis (L), which brake is connected to the central electronics (30), allowing signal transfer.

12. The wheel drive module according to claim 11, further comprising a sensor for detecting wheel characteristics of the wheel (R), for detecting a wheel speed of the wheel (R) about the wheel axis (A) and/or a steering angle of the wheel (R) about the steering axis (L), which sensor is connected to the central electronics (30), allowing signal transfer, wherein
the sensor and the safety (B) form a brake assembly (104) which can be replaced as a module.

13. The wheel drive module according to claim 1, further comprising a sensor (S4) for detecting motor characteristics of the first electric motor (M1), for detecting a rotational speed of the first electric motor (M1).

14. The wheel drive module according to claim 1, further comprising a sensor (S5) for detecting motor characteristics of the second electric motor (M2), for detecting a rotational speed of the second electric motor (M2).

* * * * *